(12) United States Patent
Albouyeh et al.

(10) Patent No.: US 9,106,652 B2
(45) Date of Patent: **\*Aug. 11, 2015**

(54) WEB CONFERENCE OVERSTAY PROTECTION

(71) Applicant: International Business Machines Corporation, Armonk, NY (US)

(72) Inventors: Shadi E. Albouyeh, Raleigh, NC (US); Bernadette A. Carter, Raleigh, NC (US); Jeffrey R. Hoy, Southern Pines, NC (US); Stephanie L. Trunzo, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/718,063

(22) Filed: Dec. 18, 2012

(65) Prior Publication Data

US 2014/0173696 A1    Jun. 19, 2014

(51) Int. Cl.
*G06F 7/04* (2006.01)
*G06F 15/16* (2006.01)
*G06F 17/30* (2006.01)
*H04L 29/06* (2006.01)
*H04L 12/18* (2006.01)

(52) U.S. Cl.
CPC ............ *H04L 63/10* (2013.01); *H04L 12/1822* (2013.01); *H04L 63/08* (2013.01)

(58) Field of Classification Search
CPC ...................................................... H04W 12/06
USPC ............................................................ 726/4
See application file for complete search history.

(56) References Cited

U.S. PATENT DOCUMENTS

| | | | |
|---|---|---|---|
| 7,100,200 B2* | 8/2006 | Pope et al. ....................... 726/10 |
| 7,971,261 B2* | 6/2011 | Pestoni ........................... 726/27 |
| 8,194,841 B2 | 6/2012 | Archambault et al. |
| 8,315,369 B2* | 11/2012 | Lawson et al. ........... 379/220.01 |
| 8,434,133 B2* | 4/2013 | Kulkarni et al. .................. 726/7 |
| 8,561,157 B2* | 10/2013 | Ge .................................... 726/6 |
| 2008/0052761 A1* | 2/2008 | Minami ............................ 726/2 |
| 2009/0157414 A1 | 6/2009 | O'Sullivan et al. |
| 2012/0110475 A1 | 5/2012 | Han et al. |
| 2013/0340041 A1* | 12/2013 | Bansal et al. ..................... 726/3 |

\* cited by examiner

*Primary Examiner* — Dant Shaifer Harriman
(74) *Attorney, Agent, or Firm* — Noah A. Sharkan

(57) ABSTRACT

Embodiments of the present invention disclose a method, computer program product, and system for managing participants of a web conference that follows a first web conference. A computer determines that a second web conference will use a web conference channel continuously following the completion of a first web conference using the web conference channel. The computer determines that a participant of the first web conference that is connected to the web conference channel at the start of the second web conference is not authorized to attend the second web conference and the computer disconnects from the web conference channel the participant that is not authorized to attend the second web conference.

13 Claims, 4 Drawing Sheets

WEB CONFERENCE OVERSTAY PROTECTION

FIELD OF THE INVENTION

The present invention relates generally to the field of web conferences, and more particularly to access control and overstay protection for web conferences.

BACKGROUND OF THE INVENTION

Web conferences are used in a variety of business, government, organizations and personal applications. Web conferences offer functions and capabilities beyond audio communication, providing a virtual meeting experience that approaches a face-to-face meeting. Web conferences generally offer functions that include audio communication, video, images, shared visual resources, dynamic texting, and downloading/uploading of materials. Those using web conferences benefit from having a near-face-to-face experience for a fraction of the cost and time to travel for meeting purposes.

Web conferencing usually involves one or more servers that may host a web conferencing application, and client devices that connect to the web application by means of a network such as the Internet. Examples of web conferencing services that are available include Citrix GoToMeeting, (a product of Citrix Online, LLC; a division of Citrix Systems Inc.), and WebEx Meetings Premium (WebEx is a registered trademark of Cisco Systems, Inc.).

Participants are typically notified of a web conference by receiving an invitation that includes the scheduling information, such as the date and time of the web conference, and access information for connecting to the web conference. Access information generally includes a universal resource locator (URL) link to access a login page of a website on the Internet, for example, and may include a web conference title and passcode.

Participants typically have or are given a means of authentication and information used to access the web conference, which may include a web link, a web conference title, and a passcode. The web conference information may be provided in an invitation that specifies the date, time and access information to the web conference, and separate invitations may be sent for separate web conferences.

There may be different roles or classes of participants that may include the host, presenter(s), discussion leaders, moderator and participants, for example. Web conferences are usually scheduled by a host or moderator, having greater privileges and control within the web conference than standard participants. The web conference information can be inadvertently or intentionally shared with others not invited directly by the web conference host, giving access to an not authorized participant.

For some web conferences, a host may require the ability to schedule ad-hoc, with a high amount of flexibility, without the need to work with or through a scheduling service. In such instances, the host may use a constant set of web conference information that allows the host to schedule a web conference for any time, and allows for scheduling web conferences such that the start of a second web conference continuously follows a first web conference. In and example, in which a second web conference continuously follows a first web conference, the participants of the first web conference that remain connected to the web conference channel have access to the second web conference that follows, by default. The terminology of "continuously following", used herein, refers to the scheduling of a second web conference that follows a first web conference such that participants of the first web conference remaining on the conference channel, have access to the second web conference by default.

To prevent inadvertent participation from one meeting to the next, some web conference controls remove all participants from the current web conference, requiring all participants to reconnect to a subsequent web conference, which consumes time, generally creates a level of disorder, and may introduce an additional level of connectivity issues, all affecting the efficiency of the subsequent web conference. In addition, there generally is little preventing not authorized participants who have access to the connection information from connecting to the web conference.

SUMMARY

Embodiments of the present invention disclose a method, computer program product, and system for managing participants of a web conference that follows a first web conference. A computer determines that a second web conference will use a web conference channel continuously following the completion of a first web conference using the web conference channel. The computer determines that a participant of the first web conference who is connected to the web conference channel at the start of the second web conference is not authorized to attend the second web conference and the computer disconnects from the web conference channel the participant that is not authorized to attend the second web conference.

In other embodiments the computer analyzes shared content from the participant of the first web conference, in which the shared content includes at least one of: verbal, audio, visual content. The computer determines if an amount of shared content from the participant, that is relevant to the second web conference, exceeds a threshold level and in response to the amount of shared content exceeding the threshold level, the computer recommends an authorization of the participant to attend the second web conference.

DETAILED DESCRIPTION

Figure 1:
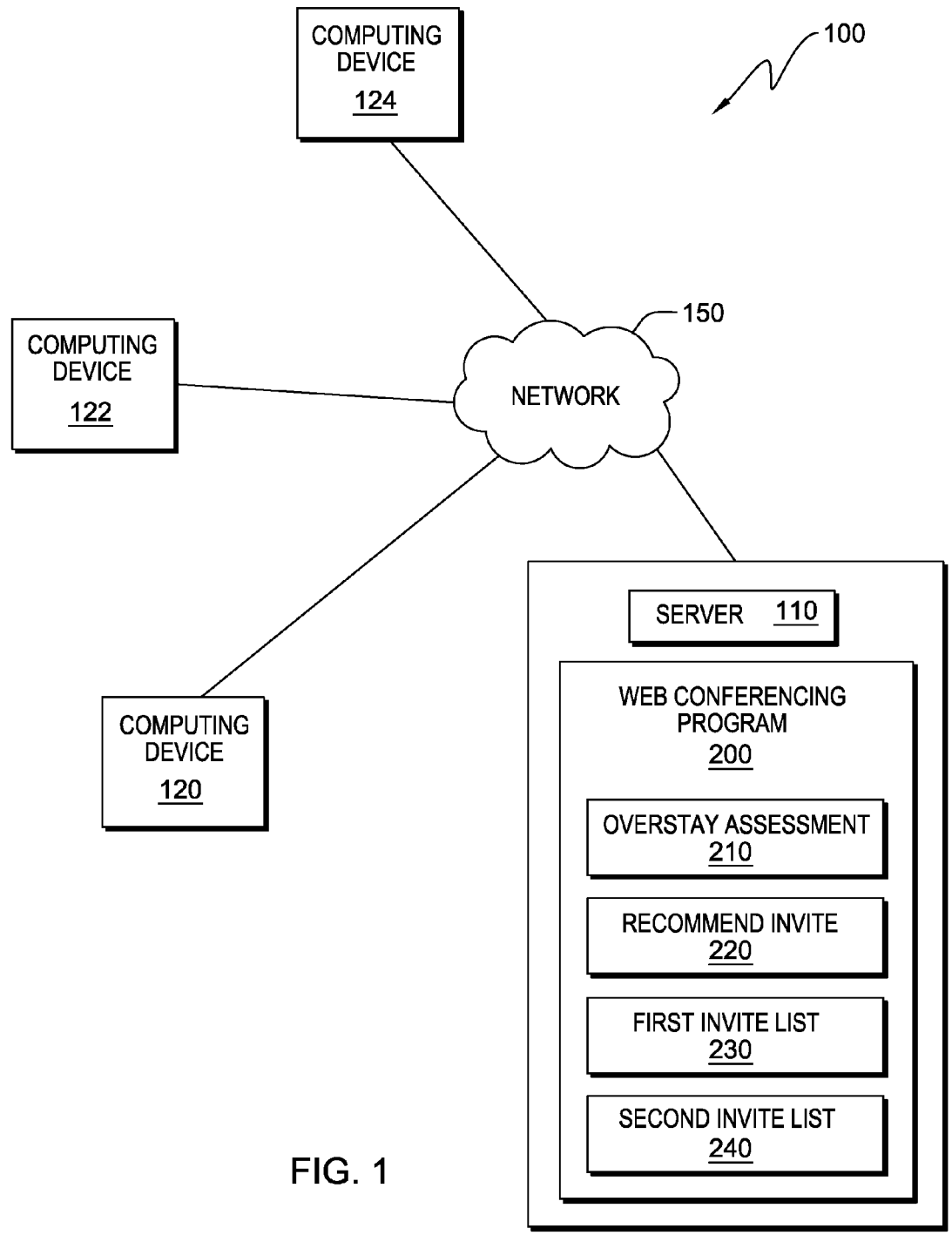
FIG. 1 is a functional block diagram illustrating a web conferencing environment, in accordance with an embodiment of the present invention

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Embodiments of the present invention recognize that participants connected to a web conference channel, which supports connection of participants to the content materials of a web conference an interconnection of participants to a web conference, remain connected to the web conference channel unless each participant manually disconnects. In embodiments of the present invention, participants remaining connected to the web conference channel after the end of a first web conference are connected by default to the channel at the beginning of a second web conference that is a follow-on the first web conference. The identities of the participants remaining connected to the web conference channel are compared to a list of identities authorized for the second web conference. The participants who are not authorized for the second web conference are disconnected from the web conference channel.

Further, other embodiments of the present invention recognize that participants of the first web conference who have demonstrated knowledge, ideas, opinions or expertise relevant to the second web conference, may be considered for authorization to attend the second web conference. Analysis of an amount of relevant participant contribution, in the first web conference, that exceeds a threshold level of participation content relevant to the second web conference, may result in a recommendation for one or more participants of the first web conference to be authorized to attend the second web conference.

The present invention will now be described in detail with reference to the Figures. FIG. 1 is block diagram illustrating web conferencing environment 100 in accordance to an embodiment of the present invention. Web conferencing environment 100 includes computing devices 120, 122, and 124, network 150 and server 110. Server 110 is shown to include first invite list 230 and second invite list 240, and web conferencing program 200 which includes program modules overstay assessment 210 and recommend invite 220.

In one embodiment, web conferencing environment 100 is an environment in which a web conference program is hosted on a server, for example, server 110, and is accessible by authenticated computing devices within web conferencing environment 100, such as computing devices 120, 122, and 124, with the appropriate web conferencing information for web conference connection. The server hosting the web conferencing program provides interconnection of client computing devices across a network, for example, network 150, and provides audio, visual, text function, content sharing, and other web conferencing functions to authorized client computing devices. Web conferencing environment 100 includes invitation lists, such as first invite list 230 and second invite list 240, corresponding to web conferences that represent authorized participants for each respective web conference. Invitation lists may be created in a calendaring function of an email program, for example, by selecting or entering information associated with each participant authorized for a scheduled web conference. As an alternative example, invitations may be created as part of a web conferencing application that includes email functionality, or the web conferencing application may be connected to or integrated with, an email program.

Network 150 interconnects the computing devices within web conferencing environment 100, such as computing devices 120, 122, and 124, and server computers, such as server 110. Network 150 may be, for example, a local area network (LAN), a wide area network (WAN) such as the Internet, or a combination of the two, and can include wired or wireless connections. In general, network 150 can be any combination of connections and protocols that will support communications via suitable channels between client computers 120, 122, and 124, and server 110, in accordance with an embodiment of the present invention.

Computing devices 120, 122, and 124, are used to connect to server 110 and access a web conferencing program, such as web conferencing program 200. A computing device, for example computing device 120, accesses the Internet via a network, such as network 150, and using either a URL that may be included in an invitation sent by email or a calendaring function integrated with email, for example, connects to web conferencing program 200 that is hosted on or accessible to, server 110. Computing device 120 provides information to web conferencing program 200 including authentication of computing device 120 and identification of the web conference to which computing device 120 is authorized to attend. In addition, computing devices 120, 122, and 124, have access to communications external to the web conference, such as email, texting (e.g., instant messaging), and social media.

In various embodiments, computing devices 120, 122, and 124, can each be a laptop computer, a tablet computer, a netbook personal computer (PC), a desktop computer, a personal digital assistant (PDA), a smart phone, a mainframe computer, or a networked server computer. In general, each of computing devices 120, 122, and 124, can be any programmable electronic device, configured to access and connect to web conferencing program 200 and as described in further detail with respect to FIG. 4. Computing devices 120, 122, and 124 can be individually identified and may include access to text messaging, email and social media applications external to web conferencing program 200.

Server 110 includes web conferencing program 200, which further includes overstay assessment 210, and recommend invite 220, both program modules of web conferencing program 200. Web conferencing program 200 provides web conference services that include, but may not be limited to, scheduling a web conference, identifying authorized attendees, and providing network accessible channels to which participants can connect to attend a web conference. Overstay assessment 210 is a program module that determines the participants on a web conference that are not authorized to attend the web conference and disconnects not authorized participants from the web conference. Recommend invite 220 is a program module that determines if participants from a first web conference should be recommended to attend a second web conference by analyzing the amount of relevant participation content materials contributed by each participant of the first web conference.

Server 110 also includes first invite list 230 and second invite list 240. First invite list 230 and second invite list 240 include a list of authorized participant identities for the first and second web conference, respectively. First invite list 230 and second invite list 240 are accessible to program modules overstay assessment 210 and recommend invite 220, and may be created when the respective web conferences are scheduled within web conferencing program 200. In other embodiments, web conferencing program 200, overstay assessment 210, and recommend invite 220, may be configured to obtain first invite list 230 and second invite list 240 from another source, for example, a calendar application.

Server 110 can be a laptop computer, a tablet computer, a netbook personal computer (PC), a desktop computer, a personal digital assistant (PDA), a smart phone, a mainframe computer, or a networked server computer. Further, server 110 may be computing systems utilizing clustered computers and components to act as single pools of seamless resources when accessed through network 150, or can represent one or more cloud computing datacenters. In general server 110 can be any programmable electronic device, configured to connect to network 150, execute web conferencing program 200, overstay assessment 210, and recommend invite 220, and further configured as described in detail with respect to FIG. 4.

Web conferencing program 200 is a web application that provides conferencing services via the internet to computing devices, such as computing devices 120, 122, and 124, within web conferencing environment 100. Web conferencing program 200 may include audio functions for verbal conversation, visual functions for display of images, presentation content, video, or free-hand generated content, and may also provide a private and/or a shared texting function within a web conferencing session. Web conference 200 may include a scheduling function to establish a date and time at which a web conference is held and may include a web conference invitation list to which authorized participants are added or entered. Alternatively, web conferencing program 200 may link to or receive from a calendaring function, the scheduling information and listing of authorized participants.

In a preferred embodiment of the present invention, web conferencing program 200 provides a continuous-access web conferencing service, activated by an authorized host or moderator, generally used for the flexibility of scheduling control. Web conferencing program 200 enables an authorized host or moderator to schedule and activate web conferences such that a second web conference may be scheduled to continuously follow a first web conference. Such scheduling can result in participants connected to the first web conference remaining connected to the follow-on second web conference without having to repeat connection activity or re-entering connection information. If the participant is authorized for the second web conference, this may be a convenience, since no log-off and log-on is required, however, for participants that are not authorized, access to the subject and information discussed in the second web conference may be inappropriate. Additionally, if participants remaining on the web conference channel following the first web conference are authorized to attend the second web conference, requiring the participants to disconnect from the conference channel and then reconnect is inefficient and can invite unnecessary reconnection complications. One skilled in the art will recognize that the example described herein, a second web conference continuously following a first web conference, is similarly representative of a third web conference following a second web conference, and other such sequences of web conferences.

Overstay assessment 210 is a module of web conferencing program 200 and in one embodiment, overstay assessment 210 may be part of web conferencing program 200, or in another embodiment it may be a plug-in, or may be a separate program initiated by a function call from web conferencing program 200. In a preferred embodiment of the present invention, in which a second web conference is scheduled to continuously follow a first web conference, overstay assessment module 210 identifies participants of the first web conference that remain connected after the completion of the first web conference, and compares the identities of connected participants to a list of authorized participant identities for a second web conference, that continuously follows the first web conference. If the participants remaining on the web conference, after the completion of the first web conference, are not authorized for the second web conference, then overstay assessment 210 disconnects the participants from the second web conference. Participants that remain connected after completion of the first web conference and are authorized to attend the second web conference are allowed to remain connected.

In an embodiment of the present invention, overstay assessment 210 obtains an invite list of authorized participants for a web conference from a web conferencing program, such as web conferencing program 200, or alternatively, overstay assessment 210 may be configured to receive an invite list of authorized participants from a calendaring application. The invite list of authorized participants might be from yet another source such as an identified wiki page, for example. Each web conference is associated with a specific invite list that includes authorized participants for the designated web conference. Each participant connecting to web conferencing program 200 has a distinct identification, and each web conference to which a participant connects, is identified in web conferencing program 200.

Overstay assessment 210 uses the distinct identification of each participant remaining connected to the web conference channel following the completion of a first web conference and compares identification to those participants authorized for the second web conference follows the first web conference. The authorized participants of the first web conference are distinguishable from participants authorized for the second web conference by referencing first invite list 230 and second invite list 240, for example. Participants connected to the web conference channel who are not included in the invite list of participants who are authorized for the second web conference are disconnected from the second web conference. Alternatively, those identified participants remaining on the web conference following the completion of the first web conference, and are included in the invite list of participants authorized for the second web conference, are not disconnected and remain connected to the second web conference.

In embodiments of the present invention, recommend invite 220 is a program module of web conferencing program 200 that recognized when a second web conference is scheduled continuously following a first web conference. Recommend invite 220 uses analysis of the content shared in the first web conference and may use content from external communication sources for which appropriate permissions have been granted, to determine the amount of content relevant to the second web conference that was contributed or shared by a participant of the first web conference. If the amount of relevant content contributed by a participant in the first web conference exceeds a threshold level, recommend invite 200 identifies the participant(s) exceeding the threshold and includes their identity(ies) in a list as participants recommended for authorization to attend the second web conference.

Recommend invite 220 determines if the second web conference is scheduled to continuously follow the first web conference by analyzing scheduling information associated with web conferences within web conferencing program 200, for example. The identities of the first web conference participants are accessed from first invite list 230. Recommend invite 220 monitors and analyzes the audio, visual/video, text messaging content, and any additional content available within the services of web application program 200. In one embodiment, recommend invite 220 uses key words and phrases submitted by the moderator of the second web conference, as relevant references against which the content shared in the first web conference is analyzed. Speech recognition and typed word recognition technology may be used to analyze and identify participant contributions during the first web conference, relevant to the second web conference. If one or more participants contribute an amount of content in the first web conference that is relevant to the second web conference, recommend invite 220 recommends the one or more participants to be included in the authorization list of participants for the second web conference. The threshold level for recommending a participant to be authorized to attend the subsequent web conference may be predefined or selected by the moderator of the second web conference.

In one embodiment, the participants recommended for authorization to attend the second web conference are presented to the moderator who may select one or more participants to attend the second web conference. In other embodiments, the recommendation may also include a justification for the recommendation, such as key words and the frequency of use, contributed in the previous web conference. Selected participants are added to the authorization list for the second web conference and are not disconnected from the second web conference by overstay assessment 210.

Figure 2:
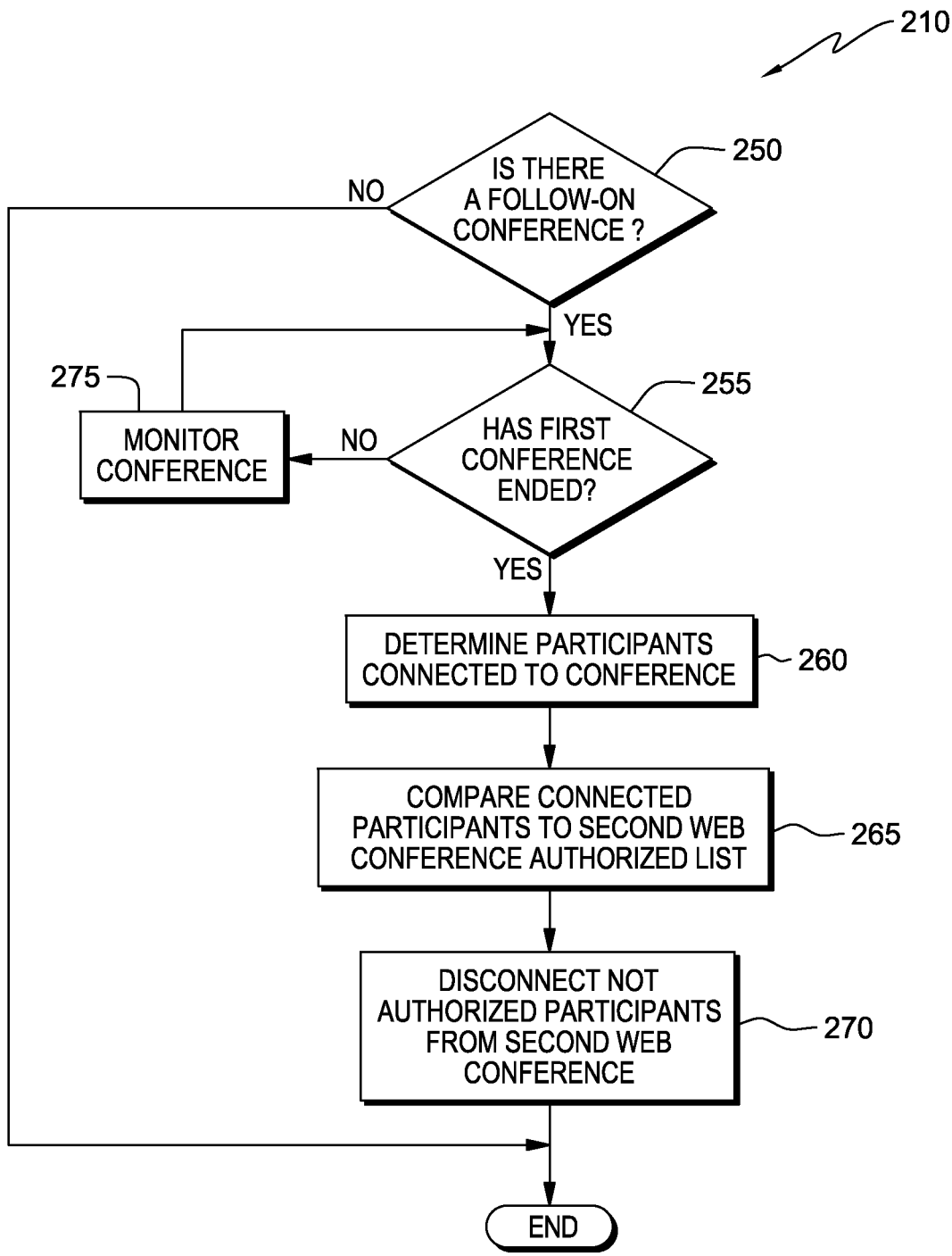
FIG. 2 is a flow chart illustrating the steps of a web conference overstay program, within the web conferencing environment of FIG. 1, in accordance with an embodiment of the present invention.

FIG. 2 is a flowchart depicting operational steps of overstay assessment 210 program module, within the web conferencing environment of FIG. 1, in accordance with an embodiment of the present invention. Overstay assessment 210 determines at the beginning of a web conference, if there is a follow-on web conference or a second web conference that continuously follows a current or first web conference. If overstay assessment 210 determines that a second web conference continuously follows a first (current) web conference (step 250, "yes" branch), overstay assessment 210 determines if the first web conference is still in progress or if it has ended. Determining that the first web conference has not ended (step 255, "no" branch), overstay assessment 210 continues to monitor the first web conference (step 275) to determine when the first web conference ends.

For example, a first web conference is initiated by web conferencing program 200 and overstay assessment 210 accesses the scheduled web conference information from web conferencing program 200 and determines that there is a follow-on web conference continuously following the first web conference (step 250 "yes" branch). In other embodiments, overstay assessment 210 may receive web conferencing scheduling information from a link to a calendar application or from manual input. In one embodiment overstay assessment 210 determines if the first web conference has ended by comparing the time of day against the scheduled duration of the web conference and monitoring participants disconnecting from the web conference to determine if a percentage of participants have disconnected from the web conference. In other embodiments overstay assessment 210 may monitor the audio, display, or text message content for key words or phrases, supplied by the second web conference monitor, to determine if the subject matter has changed to that of the second web conference. In yet other embodiments, overstay assessment 210 may receive moderator input indicating the end of the first web conference. If overstay assessment 210 determines that the first web conference has not ended, (step 255, "no" branch) then the first web conference continues to be monitored by overstay assessment 210 (step 275), for input or indication that the first web conference has ended.

Having determined that the first web conference has ended (step 255, "yes" branch), overstay assessment 210 determines the identity of participants that are still connected to the web conference (step 260). For example, overstay assessment 210 receives input from the web conference moderator that the first web conference has ended. Overstay assessment 210 determines that participants of the first web conference have remained on the web conference and retrieves the distinct identity information of each participant remaining on the web conference, from web conferencing program 200 (step 260).

Overstay assessment 210 accesses the list of authorized participants for the second web conference and compares the identities of the authorized participants to the identities of the first web conference participants that remain connected to the web conference channel after the first web conference has ended (step 265). For example, several participants from the first web conference remain connected to the web conference after overstay assessment 210 received input from the moderator that the first web conference had ended. Overstay assessment 210 retrieves from web conferencing program 200 the identities of the participants that are connected to the web conference. The identities can be an assigned an ID from an enterprise organization, or an ID from a profile input to web conferencing program 200 to gain access to the web conference, or web conferencing program 200 may use a digital certificate with certificate authority verification, or a digital signature from a private key, for example, or any other identification in which a participant is distinguished from other participants. Overstay assessment 210, accesses the list of authorized participants for the second web conference call from web conferencing program 200 and compares the identities of the participants remaining on the web after the first web conference, to the identities of those participants authorized to attend the second web conference.

Overstay assessment 210 determines those participant identities that are not authorized for the second web conference and disconnects the not authorized participants from the second web conference (step 270).

In an alternative embodiment in which a first web conference is not continuously followed by a second web conference, overstay assessment 210 determines that the web conference that is beginning has no web conference that continuously follows (step 250, "no" branch), and overstay assessment 210 ends.

Figure 3:
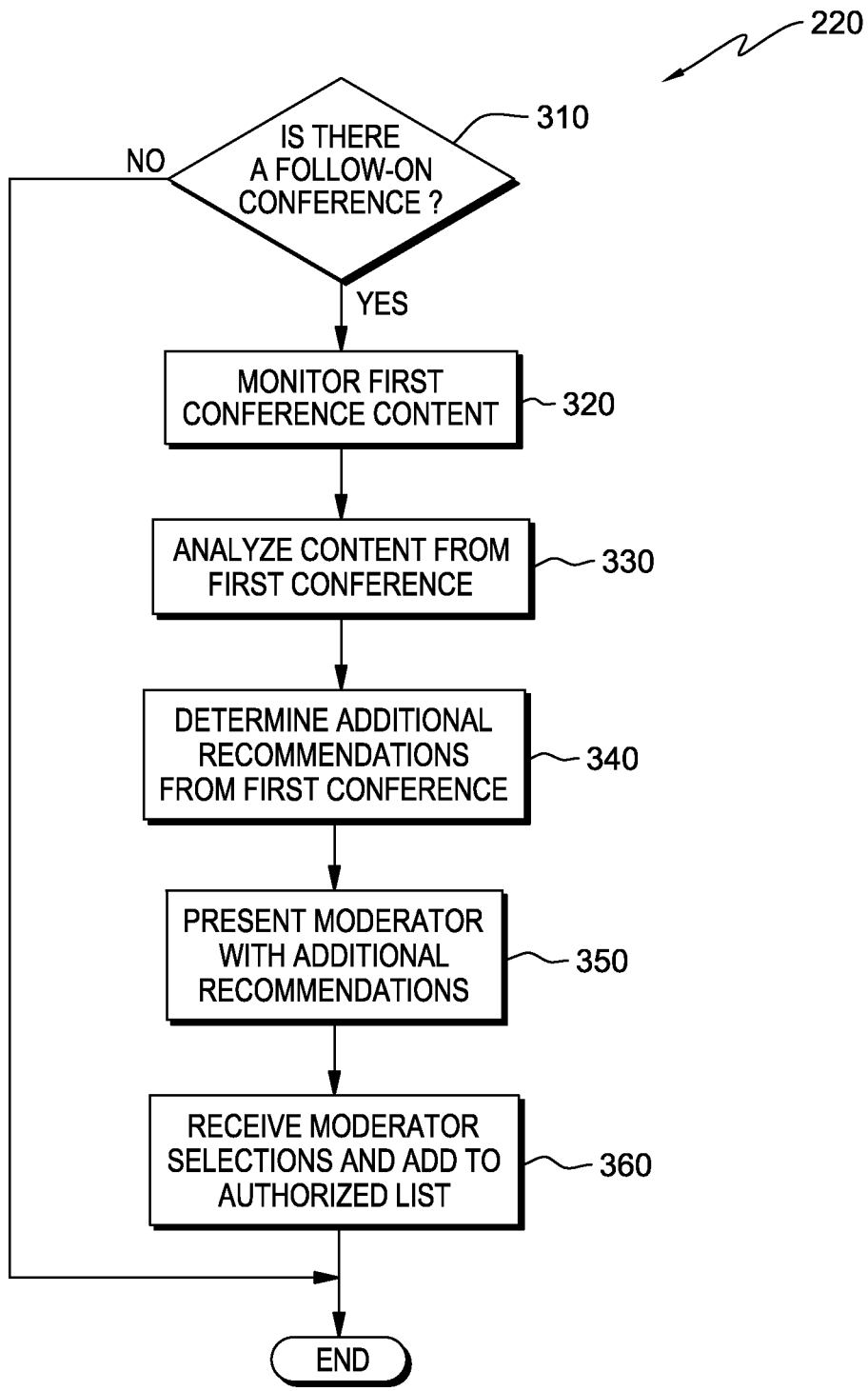
FIG. 3 is a flowchart of a web conference recommended invitation program, within the web conferencing environment of FIG. 1, in accordance with an embodiment of the present invention.

FIG. 3 is a flowchart of recommend invite 220 program module, within the web conferencing environment of FIG. 1, in accordance with an embodiment of the present invention. Recommend invite 220 determines if a first web conference that is beginning has a second web conference continuously following the first. For the case in which the first web conference is not continuously followed by a second web conference (step 310, "no" branch), recommend invite 220 ends.

Recommend invite 220, having determined that a follow-on conference continuously follows a first web conference (step 310, "yes" branch), monitors the participation content for the duration of the first web conference (step 320). For example, having determined in step 310 that a second web conference continuously follows a first web conference currently beginning, recommend invite 220 monitors the vocal discussions of the participants on the web conference as well as any display content offered and shared by participants. In addition recommend invite 220 may monitor the text messaging within the web conference service during the web conference and, if appropriate permissions have been granted, recommend invite 220 may monitor communications external to the web conference services, such as email or social networks. Recommend invite 220 monitors the web conference participation content to identify key words or phrases that are relevant to the second web conference. In one embodiment, recommend invite 220 may use initial salutations of participants joining the call and identifying themselves to other participants or the host, or recommend invite 220 may use required recitations to connect voice patterns to participant identification. In other embodiments, web conferencing program 200 may include services that indicate the identity of the participant speaking during the web conference.

The participation content monitored by recommend invite 220 is then analyzed (step 330), by comparing recognized words or phrases to key words and key phrases input to web conferencing program 200 by the moderator or host of the second web conference. In an exemplary embodiment, text, voice and speech recognition technologies are used to identify the words and phrases making up the participation content of the first web conference, as well as identifying the participant offering each part of the participation content. The recognized words and phrases are compared to the key words and key phrases, relevant to the second web conference, that have been previously input to web conferencing program 200 by the moderator of the second web conference, to find matching words and/or phrases. Key words and key phrases may also be determined from the subject or descriptive words within a calendar invite message, or any documents attached to the calendar invite message.

Recommend invite 220 uses the identified key words and phrases from the participants' shared content of the first web conference, to determine if participants from the first web conference should be invited to the second web conference. The determination is based on the amount of shared participation content contributed during the first web conference that is relevant to the second web conference (step 340).

For example, recommend invite 220 analyzes the participation content monitored during the first web conference in which computing device 120 is connected. Recommend invite 220 compares the words and phrases determined from monitoring the first web conference to the key words and phrases identified by the second web conference host or moderator that are relevant to the subject and purpose of the second web conference. In one embodiment of the present invention, a threshold level of relevant participation content is predefined by the moderator of the second web conference. The threshold may be a numeric scoring level, in which instances of key words, phrases, combinations of words, or sharing of visual content, may have a count or score associated with each instance. Recommend invite 220 may use a weighting algorithm that counts the instances of words and phrases matching the key words and key phrases relevant to the second web conference. For certain words or phrases the weighting algorithm may add an additional scoring factor due to the relative importance or priority and recommend invite 220 associates the count and scoring of matched words and phrases with the contributing participant.

For example, recommend invite 220 determines that the user of computing device 120 has verbally mentioned key words 10 times and has shared a document that includes 3 phrases that are weighted as a priority with a scoring factor of 5 times (5×) the number of instances, giving the user of computing device 120 a score of 25, [10+(3×5)]. At the end of the first web conference, recommend invite 220 computes the counts and scoring of each participant and compares the totals to a predefined threshold level, for example a threshold level score of 15. The participants exceeding the threshold level, such as the user of computing device 120 with a score of 25, are identified by recommend invite 220 (step 340).

It can be appreciated by one skilled in the art that many different algorithms and techniques are possible to determine the additional participants from the first web conference that are to be recommended for authorization to attend the second web conference and those presented above serve as an example.

Having determined additional participant recommendations for the second web conference, recommend invite 220 prepares and presents the host or moderator with a list of additional participant recommendations to be considered for the second web conference (step 350).

Recommend invite 220 receives input from the moderator of the second web conference, which includes the identities selected by the moderator to be authorized participants for the second web conference, and adds the selected identities to the list of authorized participants (step 360). For example, the moderator for the second web conference is presented with a recommendation, from recommend invite 220, that identity associated with computing device 120 should be included as authorized for the second web conference. The moderator agrees with the recommendation and selects the identity associated with computing device 120 to be authorized for the second web conference. Recommend invite 220 adds the identity associated with computing device 120 to second invite list 240, which includes the list of authorized participants for the second web conference (step 360), and recommend invite 220 ends.

Figure 4:
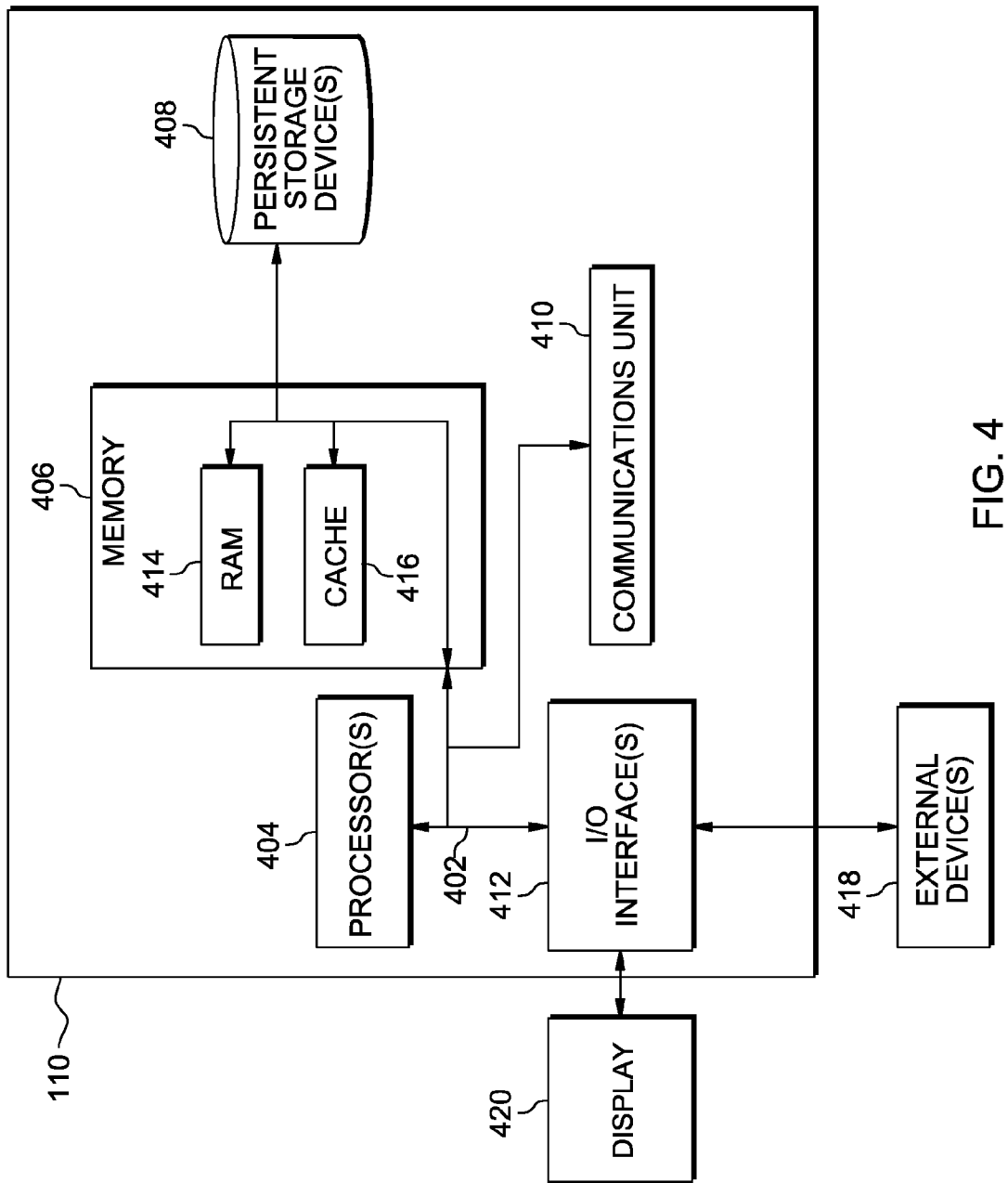
FIG. 4 depicts a block diagram of components of a web conferencing server computer, in accordance with an embodiment of the present invention.

FIG. 4 depicts a block diagram of components of server 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Web conferencing program 200, overstay assessment 210 program module, and recommend invite 220 program module, are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources within web conferencing environment 100 such as network 150 and client devices 120, 122, 124. In these examples, communications unit 410 includes one or more network interface cards. Communications unit 410 may provide communications through the use of either or both physical and wireless communications links. Web conferencing program 200, overstay assessment 210 program module, and recommend invite 220 program module, may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., web conferencing program 200, overstay assessment 210 program module, and recommend invite 220 program module, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for managing participants of a web conference that follows a first web conference, the computer program product comprising one or more computer-readable storage devices and program instructions stored on the one or more computer-readable storage devices, the program instructions comprising:
    program instructions to determine that a second web conference continuously follows a first web conference using a same web conference channel;
    program instructions to determine whether a participant that is authorized to attend the first web conference, and not authorized to attend the second web conference on the same web conference channel, remains connected to the same web conference channel during the second web conference; and
    program instructions to disconnect the participant from the same web conference channel, in response to determining that the participant remains connected to the same web conference channel during the second web conference.

2. The computer program product of claim 1, further comprising:
    program instructions to analyze shared content from the participant of the first web conference, wherein the shared content includes at least one of: verbal, audio, and visual content;
    program instructions to determine if an amount of shared content from the participant that is relevant to the second web conference exceeds a threshold level; and
    in response to the amount of shared content exceeding the threshold level, program instructions to recommend an authorization of the participant to attend the second web conference.

3. The computer program product of claim 1, wherein an identity of the participant that is not authorized to attend the second web conference is presented to a moderator of the second web conference to confirm disconnection from the web conference channel.

4. The computer program product of claim 2, wherein the responding to the amount of shared content exceeding the threshold level, further comprises:
    program instructions to authorize the participant to attend the second web conference without the confirmation of a moderator.

5. The computer program product of claim 2, wherein the threshold level includes a count, a score or a frequency of occurrence of additional content provided by a moderator of the second web conference, identified within the shared content of the participant of the first web conference that is relevant to the second web conference.

6. The computer program product of claim 2, wherein program instructions to recommend an authorization of the at least one participant to attend the second web conference, further comprises:
    program instructions to display information to a moderator, the information including a justification for recommending the authorization of the participant to attend the second web conference.

7. The computer program product of claim 2, wherein the determining the amount of shared content from the participant of the first web conference that is relevant to the second web conference further comprises:
    program instructions to compare the shared content to additional content provided by a moderator of the second web conference.

8. A computer system for managing participants of a web conference that follows a first web conference, the computer system comprising:
    one or more computer processors of a computer device;
    one or more computer-readable storage devices; and
    program instructions stored on the one or more computer-readable storage devices for execution by at least one of the one or more computer processors, the program instructions comprising:
    program instructions to determine that a second web conference continuously follows a first web conference using a same web conference channel;
    program instructions to determine whether participant that is authorized to attend the first web conference, and not authorized to attend the second web conference on the same web conference channel, remains connected to the same web conference channel during the second web conference; and
    program instructions to disconnect the participant from the same web conference channel, in response to determining that the participant remains connected to the same web conference channel during the second web conference.

9. The computer system of claim 8, further comprising:
    program instructions to analyze shared content from the participant of the first web conference, wherein the shared content includes at least one of: verbal, audio, and visual content;
    program instructions to determine if an amount of shared content from the participant that is relevant to the second web conference exceeds a threshold level; and
    in response to the amount of shared content exceeding the threshold level, program instructions to recommend an authorization of the participant to attend the second web conference.

10. The computer system of claim 8, wherein an identity of the participant that is not authorized to attend the second web conference, program instructions to present the identity of the participant to a moderator of the second web conference to confirm disconnection from the web conference channel.

11. The computer system of claim 9, wherein the threshold level includes one or a combination of: a count, a score or a frequency of occurrence of previously defined content, identified within the shared content of the participant of the first web conference that is relevant to the second web conference.

12. The computer system of claim 9, wherein recommending an authorization of the participant to attend the second web conference, further comprises:
    program instructions to display information to a moderator, the information including a justification for recommending the authorization of the participant to attend the second web conference.

13. The computer system of claim 9, wherein the program instructions to determine the amount of shared content from the participant of the first web conference that is relevant to the second web conference further comprises:
    program instructions to compare the shared content to additional content provided by a moderator of the second web conference.

* * * * *